(12) United States Patent
Lee

(10) Patent No.: US 10,569,740 B2
(45) Date of Patent: Feb. 25, 2020

(54) SYSTEM AND METHOD FOR SMARTKEY-FREE VEHICLE CONTROL

(71) Applicants: Hyundai Motor Company, Seoul (KR); Kia Motors Corporation, Seoul (KR)

(72) Inventor: Jeongtae Lee, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/206,301

(22) Filed: Nov. 30, 2018

(65) Prior Publication Data

US 2019/0217816 A1   Jul. 18, 2019

(30) Foreign Application Priority Data

Jan. 12, 2018   (CN) .......................... 2018 1 0029671

(51) Int. Cl.

| | |
|---|---|
| *B60R 25/24* | (2013.01) |
| *H04W 12/00* | (2009.01) |
| *H04W 12/06* | (2009.01) |
| *G06K 7/14* | (2006.01) |
| *B60R 25/20* | (2013.01) |
| *G06K 19/06* | (2006.01) |
| *H04W 4/80* | (2018.01) |
| *H04W 4/40* | (2018.01) |

(52) U.S. Cl.
CPC ............ *B60R 25/24* (2013.01); *B60R 25/209* (2013.01); *G06K 7/1417* (2013.01); *G06K 19/06037* (2013.01); *H04W 4/40* (2018.02); *H04W 4/80* (2018.02); *H04W 12/00407* (2019.01); *H04W 12/06* (2013.01); *B60R 2325/101* (2013.01); *B60R 2325/103* (2013.01); *B60R 2325/105* (2013.01); *B60R 2325/205* (2013.01)

(58) Field of Classification Search
CPC ...... G07C 9/00309; G07C 2009/00769; G07C 9/00571; G07C 9/00111; G07C 9/00007; G07C 2209/63; G07C 2009/00793; G07C 9/00103; G07C 9/00896; G07C 9/00174
USPC ........................................ 340/5.61
See application file for complete search history.

(56) References Cited

U.S. PATENT DOCUMENTS

| | | | |
|---|---|---|---|
| 9,116,786 B2 * | 8/2015 | Ricci | G06F 17/00 |
| 10,388,081 B2 * | 8/2019 | Ricci | H01Q 1/325 |

(Continued)

*Primary Examiner* — Mark S Blouin
(74) *Attorney, Agent, or Firm* — Slater Matsil, LLP

(57) ABSTRACT

A system for smartkey-free vehicle control may include a head unit having predetermined password and generating a scannable visual code by combining information of the vehicle. A user application is installed in a user terminal and is capable for registering the information of the vehicle, and has a remote control function to control the vehicle of which information is registered. A communicating unit connects, though wireless communication, with the user application of the user terminal which is within a predetermined sensing distance, and performs a first and second authentication. A body control module controls the vehicle according to a remote control signal transmitted according to the remote control function of the user application. A start button is formed inside the vehicle and generating a start on signal by a button input and a controller controls a starting of the vehicle.

19 Claims, 7 Drawing Sheets

(56) References Cited

U.S. PATENT DOCUMENTS

2017/0249791 A1* 8/2017 Woo .................... G07C 9/00111
2017/0374550 A1* 12/2017 Auer .................... H04B 5/0025
2018/0013211 A1* 1/2018 Ricci .................... G06Q 20/105

* cited by examiner

SYSTEM AND METHOD FOR SMARTKEY-FREE VEHICLE CONTROL

CROSS-REFERENCE TO RELATED APPLICATIONS

This application claims priority to Chinese Patent Application No. 201810029671.9, filed in the Chinese Intellectual Property Office on Jan. 12, 2018 which application is hereby incorporated herein by reference.

TECHNICAL FIELD

The present invention relates to a system and method for smartkey-free vehicle control.

BACKGROUND

In the past, most of vehicles were to be opened/closed or started only with inserting a key into the door or key box. But recently, vehicles applying a system using a smartkey or FOB key, so that door opening/closing or engine starting, is available even without inserting the key or pressing a button but only with having the key are gradually increased.

Meanwhile, as a research for the connected vehicle is recently increased, smartkey-free systems are being developed or launched in which the user opens/closes the door or starts the vehicle using a smartphone possessed by the user without using the FOB key or smartkey.

Representative methods include technologies using Near Field communication (NFC) and Bluetooth Low Energy (BLE) communication of smartphones.

Here, since the NFC is a method in which the user is directly in contact with the smartphone, it is excellent in security, but has a disadvantage in that a communication distance is short and has problems that it is inconvenient to use the NFC because the user should be in contact with the smartphone (NFC) every time to open or close the door or starting the vehicle. The cost of related parts for recognition is also increased.

On the other hand, since these problems can be solved by applying BLE communication technology, smartkey-free system using the BLE communication has been recently spotlighted.

FIG. 1 is an illustrative view illustrating a smartkey-free vehicle control system using a conventional BLE and a problem thereof.

Referring to FIG. 1, a conventional smartkey-free vehicle control system is connected to a smartphone of a user through BLE communication to open/close a door of the vehicle and to control a start thereof.

However, since the BLE operates at a communication distance within about loom based on BT ver4.2, there are problems that it is vulnerable to security and the doors may be opened or vehicle may be started by others when a signal is hacked within the above-mentioned distance.

Therefore, in developing the smartkey-free using BLE communication, there is a strong demand for a method for further improving security.

The above information disclosed in this Background section is only for enhancement of understanding of the background of the invention and therefore it may contain information that does not form the prior art that is already known in this country to a person of ordinary skill in the art.

SUMMARY

The present invention relates to a system and method for smartkey-free vehicle control. Particular embodiments relate to a system and method for smartkey-free vehicle control supporting a smartkey-free door opening/closing and engine starting function of a vehicle without a smartkey.

Embodiments of the present invention have been made in an effort to provide a system and method for a smartkey-free vehicle control having advantages of preventing the risk of vehicle seizure and improving security of a smartkey-free vehicle control in developing a smartkey-free control function for a connected vehicle.

A system for smartkey-free vehicle control according to an exemplary embodiment of the present invention may include a head unit having predetermined password and generating a scannable visual code by combining information of the vehicle. A user application is installed in a user terminal, capable for registering the information of the vehicle by scanning the visual code, and having a remote control function to control the vehicle of which information is registered. A communicating unit connects, though wireless communication, with the user application of the user terminal which is within a predetermined sensing distance, and performs a first and second authentication. A body control module controls the vehicle according to a remote control signal transmitted according to the remote control function of the user application. A start button is formed inside the vehicle and generates a start on signal by a button input. A controller controls a starting of the vehicle. The information of the vehicle includes at least a Vehicle Identification Number (VIN), a first authentication key and a second authentication key. When the first authentication is successful, the remote control function is activated, including at least door lock/unlock function but not including a vehicle starting function. When the start on signal is input, the controller starts the vehicle only in case the second authentication is succeeded.

The communicating unit may be implemented by Bluetooth low energy (BLE).

The communicating unit may include an RF antenna radiating an RF signal to the outside of the vehicle and performing a remote wireless communication connection with the user terminal, and a communication control module storing authentication information of a first authentication code and a second authentication code which are independent from each other for performing the first and second authentication when it is connected with the user application.

When the user terminal within the predetermined sensing distance is detected, the communication control module may connect with the user application through wireless communication, and transmits the first authentication code to the user application after, and when the start on signal is input, the communication control module connects with the user application, checks a Received Signal Strength Indication (RSSI) value, and transmits the second authentication code to the user application when the RSSI value is equal to or greater than a predetermined value.

The communicating unit further may comprise an LF antenna radiating an LF signal to the inside of the vehicle and performing a local wireless communication connection with the user application, and the communication control module connects with the user application through the LF antenna.

The controller may transmit the start on signal to any one driving source of an engine, a driving motor, and a fuel cell stack according to the kind of the vehicle and initiates the starting of the vehicle.

The communicating unit may be implemented by any one communication device of Wi-Fi, wireless LAN, radio frequency (RF), and ZigBee that perform local communication connection with the user terminal.

A method for smartkey-free vehicle control of a system for smartkey-free vehicle control according to an exemplary embodiment of the present invention may include operating the user application, registering the information of the vehicle in the user application; performing, by the user application and the communicating unit, a first authentication, activating a remote control function in the user application when the first authentication is succeeded, performing, by the user application and the communicating unit, a second authentication when the start on signal is input, and initiating the starting of the vehicle when the second authentication is succeeded. The remote control function includes at least door lock/unlock function, and does not include vehicle starting function.

The registering the information of the vehicle in the user application may comprise inputting, by a user, the predetermined password on the head unit; generating, by the head unit, the visual code by combining the information of the vehicle, scanning, by the user application, the visual code, interpreting the scanned visual code and loading the information of the vehicle, and storing, by the user application, the information of the vehicle. The information of the vehicle includes at least Vehicle Identification Number (VIN), a first authentication key, and a second authentication key.

The storing the information of the vehicle may include: when the loaded vehicle information overlaps with a previously registered vehicle information, deleting the previously registered vehicle information and storing the loaded vehicle information, and when the loaded vehicle information does not overlap with the previously registered vehicle information, storing the loaded vehicle information.

The performing the first authentication may comprise connecting, by the communicating unit, with the user application of the user terminal within the predetermined sensing distance, transmitting, by the communicating unit, a first authentication code to the user application, and determining, by the user application, whether the first authentication key is valid based on the first authentication code. Performing the second authentication may comprise connecting, by the communicating unit, with the user application, determining, by the communicating unit, whether a Received Signal Strength Indication (RSSI) value is equal to or greater than a predetermined value, transmitting, by the communicating unit, a second authentication code to the user application, and determining, by the user application, whether the second authentication key is valid based on the first and second authentication key.

The performing the first authentication may further comprise determining, by the communicating unit, the first authentication to be failed when the wireless communication with the user application is failed or the first authentication key is not valid, and retrying the first authentication when the first authentication is failed. Performing the first authentication may further comprise determining, by the communicating unit, the second authentication to be failed when the RSSI value is less than the predetermined value or the second authentication key is not valid, and retrying the second authentication when the second authentication is failed.

In performing the first authentication, the communicating unit may connect with the user application through a RF antenna of the communicating unit. In performing the second authentication, the communicating unit connects with the user application through a LF antenna or the RF antenna of the communicating unit. The predetermined value is a first determined value when the communicating unit connected with the user application through the LF antenna, and the predetermined value is a second determined value when the communicating unit connected with the user application through the RF antenna.

The operating the user application may further comprise determining, by the user, whether to register the information of the vehicle in the user application, and performing, by the communicating unit, the first authentication without the registering the information of the vehicle in the user application.

In addition, other effects, which may be obtained or expected by the exemplary embodiments of the present invention, will be directly or implicitly disclosed in the detailed description of the embodiments of the present invention. That is, various effects expected according to the exemplary embodiments of the present invention will be disclosed in the detailed description to be described below.

DETAILED DESCRIPTION OF ILLUSTRATIVE EMBODIMENTS

Figure 1:
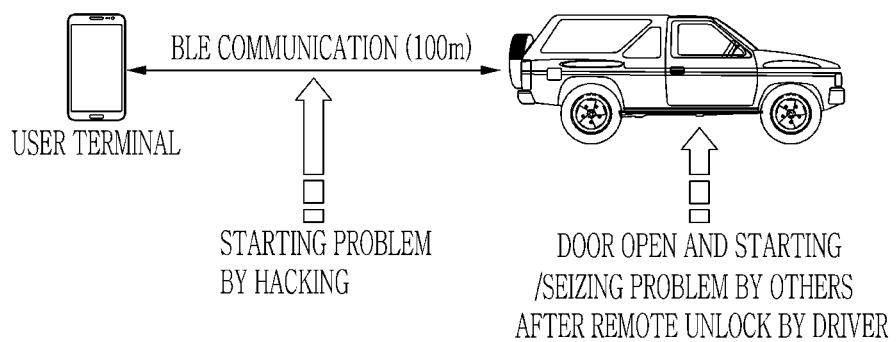
FIG. 1 is an illustrative view illustrating a smartkey-free vehicle control system using a conventional BLE and a problem thereof.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

Vehicles, automobiles or other similar terms used throughout the specification includes sports utility vehicles (SUVs), buses, trucks, cars including various commercial vehicles, ships including various kinds of boats and vessels, aircraft, and vehicles similar thereto, and includes hybrid vehicles, electric vehicles, plug-in hybrid electric vehicles, hydrogen fuel vehicles, and other alternative fuel (e.g., fuel obtained from sources other than oil) vehicles.

Hereinafter, a system and method for a vehicle control according to exemplary embodiments of the present invention will be described in detail with reference to the accompanying drawings.

A method or apparatus in compliance with an industry standard is to be interpreted as being in compliance with any such reference that was in affect as of the filing of this patent.

Figure 2:
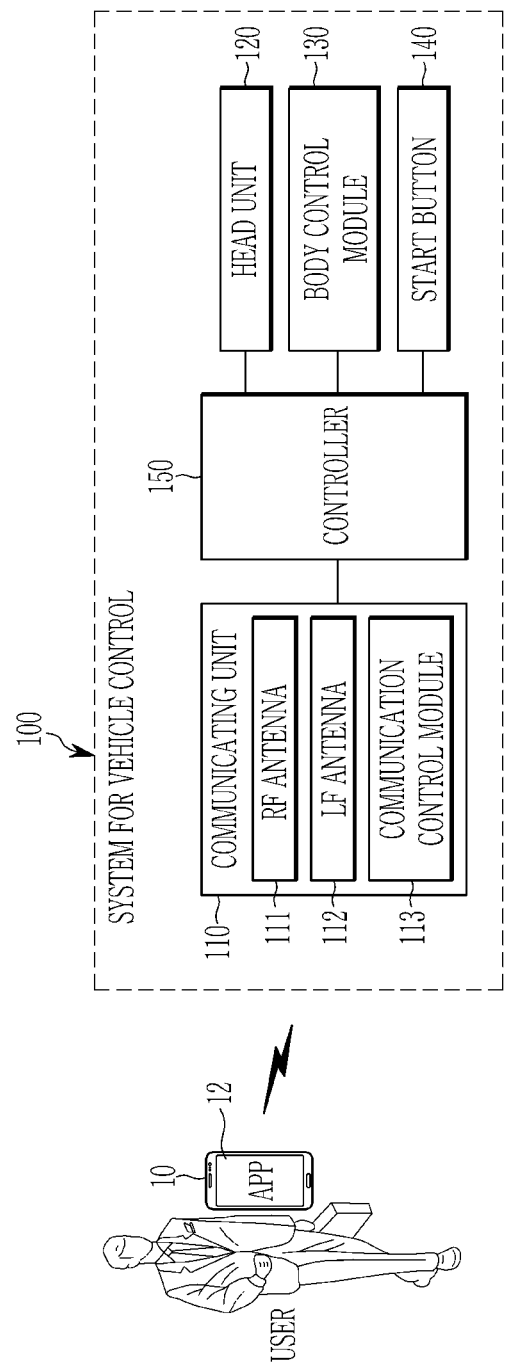
FIG. 2 is a block diagram schematically illustrating a configuration of a system for smartkey-free vehicle control according to an exemplary embodiment of the present invention.

FIG. 2 is a block diagram schematically illustrating a configuration of a system for smartkey-free vehicle control according to an exemplary embodiment of the present invention.

Referring to FIG. 2, a system 100 for a smartkey-free vehicle control according to an exemplary embodiment of the present invention includes a communicating unit 110, a head unit, a body control module (BCM) 130, a start button 140, and a controller 150.

The communicating unit 110 connects wireless communication with a user application 12 installed in a user terminal 10 and performs communication for supporting a smartkey-free control function of a vehicle.

The user terminal 10, which is an information communication terminal possessed by a user, is not limited to following examples, but may be a smartphone, a wearable terminal, a notebook, a tablet PC, or the like which is capable of communicating with the communicating unit 110.

For example, the communicating unit 110 includes Bluetooth Low Energy (BLE) and the BLE may communicate with the user terminal 10 within about loom based on BT ver4.2. The BLE is not limited to BT ver4.2 version, but other up/down versions may be applied and a communication distance may be changed accordingly.

The communicating unit 110 may be mounted in an audio, video, navigation (AVN) or a telematics unit, and includes a radio frequency (RF) antenna in, and a communication control module 113.

The communicating unit 110 may further include a low frequency (LF) antenna 112 for local wireless communication.

The RF antenna in radiates an RF signal around the vehicle within about loom based on BT ver4.2 and connects remote wireless communication with the user terminal 10 existing outside or inside the vehicle.

The LF antenna 112 radiates an LF signal to an interior of the vehicle and connects local wireless communication with the user terminal 10 existing in the interior of the vehicle.

The communication control module 113 controls an overall operation for connecting the user application 12 with BLE communication through the RF antenna 111 and the LF antenna 112.

The communication control module 113 stores authentication information of a first authentication key and a second authentication code which are independent from each other for each connecting wireless communication with the user terminal 10 through the RF antenna 111 and the LF antenna 112.

In addition, the communication control module 113 may perform authentication with an independent unique authentication key value of each of the antennas when the wireless communication is connected to the user terminal and connect the user application 12 that has succeeded in authentication.

The head unit 120 has a predetermined PIN code for operation, so that the registration of the information of the vehicle to the user application 12 becomes available only when the predetermined PIN code is input to the head unit 120.

The head unit 120 generates visual code (e.g., QR code) by combining the information of the vehicle. The user application 12 scans and interprets the visual code, loads the vehicle information, and stores it.

The body control module 130 controls the vehicle according to the remote control signal transmitted by the remote control function of the user application 12.

Figure 3:
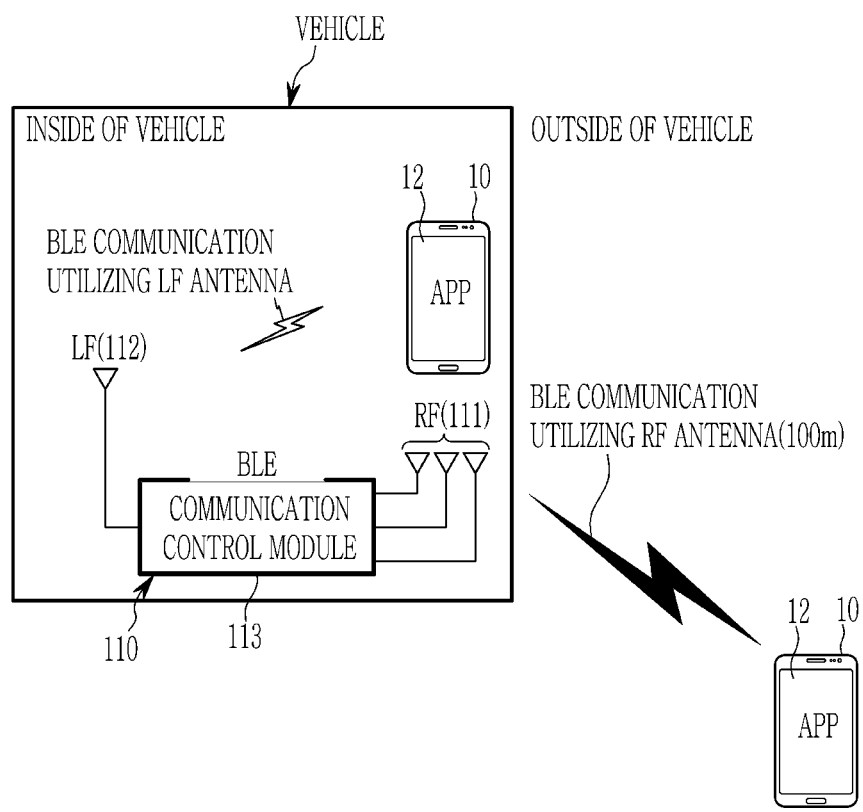
FIG. 3 is a conceptual view illustrating a method for connecting a user terminal with a communicating unit according to an exemplary embodiment of the present invention.

FIG. 3 is a conceptual view illustrating a method for connecting a user terminal with a communicating unit according to an exemplary embodiment of the present invention.

Referring to FIG. 3, the communicating unit 110 according to an exemplary embodiment of the present invention may include four multi-input systems based on BT ver.4.2 and may include three RF antennas in for remote communication outside the vehicle and one LF antenna 112 for local communication inside the vehicle.

The RF antenna 111 is a basic antenna of BLE, through which communication control module 113 of the communicating unit 110 connects wireless communication with a user application 12 of a user terminal 10 within 100 m, which is a maximum sensing distance.

The LF antenna 112 connects local wireless communication connection with the user application of the user terminal 10 existing inside the vehicle. Here, the LF antenna 112 forms a communication region for Bluetooth communication inside the vehicle and serves as an indoor antenna for searching for whether the user terminal 10 exists inside the vehicle.

The communication control module 113 connects wireless communication with a user application 12 of a user terminal 10 within sensing distance of the RF antenna 111 and transmits a first authentication code to the user application 12. The user application 12 determines whether a predetermined first authentication key is valid based on the first authentication code. When the start authentication key is determined to be valid, the first authentication succeeds, and a remote control function of the user application 12 is activated.

Here, the remote control function of the user application 12 includes at least door lock/unlock function so that the user can remotely lock or unlock the door of the vehicle.

In detail, the communication control module 113 may transmit the door lock/undock signal transmitted from the user application 12 through the RF antenna 111 to a body control module 130, and the body control module 130 may remotely lock or unlock the door of the vehicle according to the door lock/undock signal.

Further, when a starting on signal is input from a start button 140, the communication control module 113 connects local wireless communication with the user application 12 and performs a second authentication. Thereby, when the user terminal 10 exists inside the vehicle, the connection through the RF antenna 111 is switched to the connection through the LF antenna 112.

Here, since the communicating unit 110 communicates with the user terminal 10 through one LF antenna 112, it can be difficult to directivity and sensitivity having high precision such as a smartkey system including three to four LF antennas.

Therefore, the communication control module 113 of the communicating unit 110 may check received signal strength indicator (RSSI) through LF antenna which is tuned for each of the vehicles and determine that the user terminal 10 is within an allowed range inside the vehicle when RSSI is a reference value or more.

Further, when the LF antenna 112 and the user application 12 are communicated with each other, the communication control module 113 may perform authentication with independent second authentication key which is different from the case of the connection of the RF antenna 111.

Here, the case in which the RSSI value of the user terminal 10 is equal to or greater than the predetermined value, and the case in which the second authentication key is determined to be valid based on the first and second authentication code which are different from each other are defined as states in which a second authentication condition according to an exemplary embodiment of the present invention is satisfied.

As such, according to an exemplary embodiment of the present invention, the controller 150 may initiate the starting of the vehicle only when the secondary authentication is succeeded. That is, if any one of the defined the second authentication conditions is not satisfied, the vehicle may not be started, and since a motor-driven power steering (MDPS) also locks and not moves, the vehicle may not be driven.

Therefore, the system 100 for a vehicle control according to an exemplary embodiment of the present invention may improve security of a vehicle control because a vehicle starting function is limited in a case in which all the second authentication conditions are not satisfied, even though a corresponding signal is sniffed by a hacking of an intruder in a state in which the communicating unit 110 is connected to the user terminal through RF antenna 111.

Referring again to FIG. 2, the body control module 130 performs the vehicle control such as the door unlock and the door lock according to the remote control signal received from the communicating unit 110.

Further, the body control module 130 may further control an open of a tail gate, an open of a door window, and an emergency light and an alarm sound output for displaying a parking position of the vehicle according to instructions of the remote control signal. The instructions may be input through the user application 12.

The start button 140 generates a start on signal by a button input and generates a start off signal by a button input in a state in which the vehicle is started.

The controller 150 controls an overall operation for a smartkey-free starting control according to an exemplary embodiment of the present invention and includes hardware, programs, and data for the control. To this end, the controller 150 may be implemented as at least one processor that is operated by a predetermined program, and the predetermined program may be programmed in order to perform each step of a method for smartkey-free vehicle control according to an exemplary embodiment of the present invention.

The controller 150 may include a smartkey controller (SMK) to which a smartkey-free starting control function is added, but is not limited thereto, and may also include an electronic control unit (ECU) of a super ordinate concept controlling a variety of controllers provided to operate the vehicle, including the smartkey controller.

The controller 150 may determine whether the second authentication condition is satisfied, initiate the vehicle starting when the second authentication condition is satisfied, and restrict the vehicle starting when the second authentication condition is not satisfied.

When the second authentication succeeds in the state in which the starting on signal is input to the controller 150, the controller transmits the start on signal to a driving source (not shown) of the vehicle and initiates the starting of the vehicle. Here, the driving source may be any one of an engine, a driving motor, and a fuel cell stack according to a kind of the vehicle and an operation thereof may be initiated according to the starting of the vehicle.

In addition, it is apparent that the controller 150 may further check whether usual starting conditions of an existing smartkey controller are satisfied, when the signal of the start button 140 is input. The usual starting conditions may include conditions such as a P/N stage state of a transmission and/or a brake on state.

Meanwhile, a method for a vehicle control for a smartkey-free vehicle control according to an exemplary embodiment of the present invention will be described with reference to FIG. 4 to 7 based on the configuration of the system 100 for a vehicle control described above.

Figure 4:
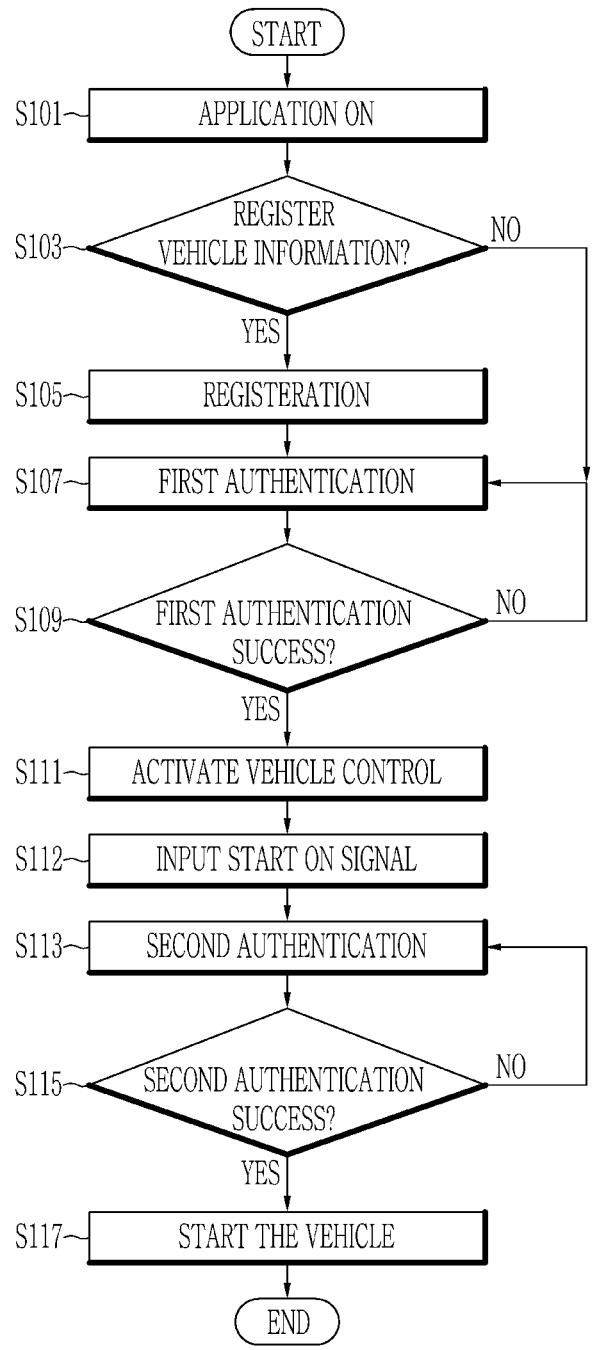
FIG. 4 is a flowchart schematically illustrating a method for a smartkey-free vehicle control according to an exemplary embodiment of the present invention.

FIG. 4 is a flowchart schematically illustrating a method for a smartkey-free vehicle control according to an exemplary embodiment of the present invention.

Referring to FIG. 4, the user operates a user application 12 installed in a user terminal for the smartkey-free vehicle control in step S101.

The user determines whether to register the information of the vehicle in the user application 12 in step S103.

If the vehicle information is not registered in the user application 12 before, the user application 12 registers the vehicle information in step S105. If the vehicle information is already registered in the user application 12, the user application 12 may not perform the registration.

When the vehicle information is registered in the user application 12, the communicating unit 110 and the user application 12 performs wireless communication connection and a first authentication in step S107.

When the first authentication is succeeded, a remote control function for the vehicle is activated in the user application 12. On the other hand, when the first authentication is failed, the communicating unit 110 and the user application 12 retry the first authentication in step S109.

When the first authentication is succeeded and the remote control function of the user application 12 is activated, the user can remotely control the vehicle through the user application 12. The remote control function of the user application 12 includes at least door lock/unlock function so that the user can remotely lock or unlock the door of the vehicle.

As a result, in the predetermined communicating distance, the user can remotely unlock the door of the vehicle of which information is registered in the user application 12 and enter the vehicle.

Meanwhile, the remote control function according to an exemplary embodiment of the present invention may not include the vehicle starting function. As a result, even in the case the wireless communication between the vehicle and the user application is hacked, it is impossible to remotely initiate the vehicle starting as described above, and therefore the probability of vehicle seizure may be significantly reduced.

When the user enters the vehicle and presses a start button 140 to start the vehicle, a stating on signal is generated at the start button and transmitted to a controller 150 in step S112.

When the starting on signal is input to the controller 150, the communicating unit 110 and the user application 12 performs a second authentication in step S113.

When the second authentication is succeeded, the controller 150 initiates the vehicle in step S117. On the other hand, when the second authentication is failed, the communicating unit 110 and the user application 12 retry the second authentication in step S115.

Figure 5:
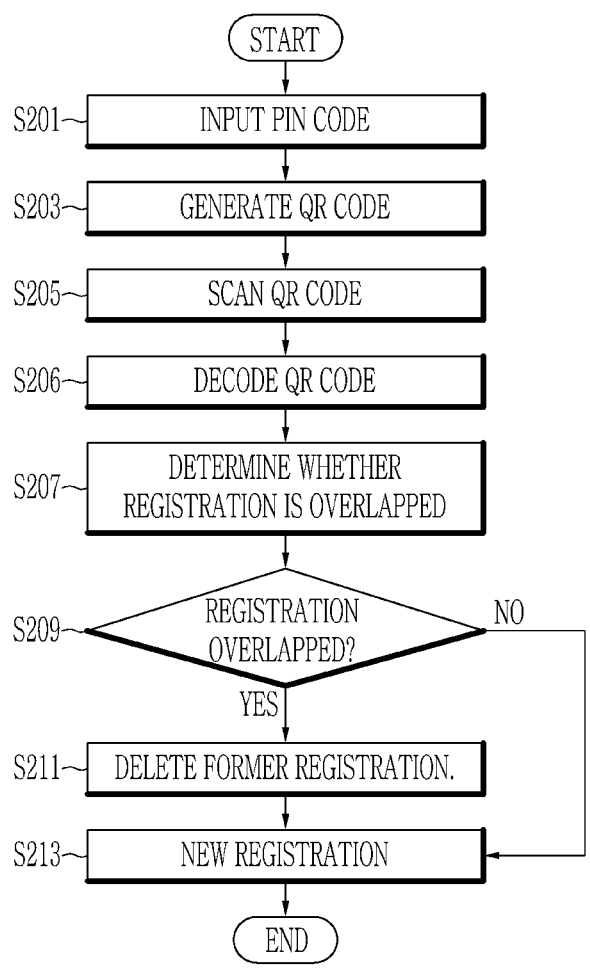
FIG. 5 is a flowchart schematically illustrating a step of registration according to an exemplary embodiment of the present invention.

FIG. 5 is a flowchart schematically illustrating a step of registration according to an exemplary embodiment of the present invention.

Referring to FIG. 5, User inputs a predetermined PIN code on a head unit 120 to register vehicle information in a user application 12 in step S201. The PIN code may be replaced by other types of password.

The head unit 120 generates a QR code by combining the vehicle information in step S203. The user application 12 scans the generated QR code in step S205, and loads the vehicle information from the QR code by interpreting it in step 206.

The vehicle information includes a Vehicle Identification Number (VIN), and the VIN is used in the following registration or authentication steps for checking whether the vehicle is already registered. Also, the vehicle information includes a first and second authentication key used a first and second authentication.

The user application 12 determines whether the loaded vehicle information overlaps with previously registered vehicle information in step S209. When the loaded vehicle information overlaps with previously registered vehicle information, the user application 12 deletes the previously registered vehicle information in step S211 and stores the loaded vehicle information in step 213. On the other hand, when the loaded vehicle information does not overlap with the previously registered vehicle information, the user application 12 stores the loaded vehicle information.

The QR code may be replaced by other types of visual codes capable for containing and transferring vehicle information as described above.

As described above, a system for smartkey-free vehicle control according to an exemplary embodiment of the present invention provides a head unit which requires user to input a predetermined password and scanning a visual code such as QR code directly with a user application of a user terminal for initial registration step which is necessary for wireless communication of the vehicle.

As a result, the exemplary embodiment of the present invention can prevent a unauthorized person from hacking the wireless communication to obtain authority for vehicle control such as door unlock, and therefore the security of the vehicle system may be significantly improved.

Figure 6:
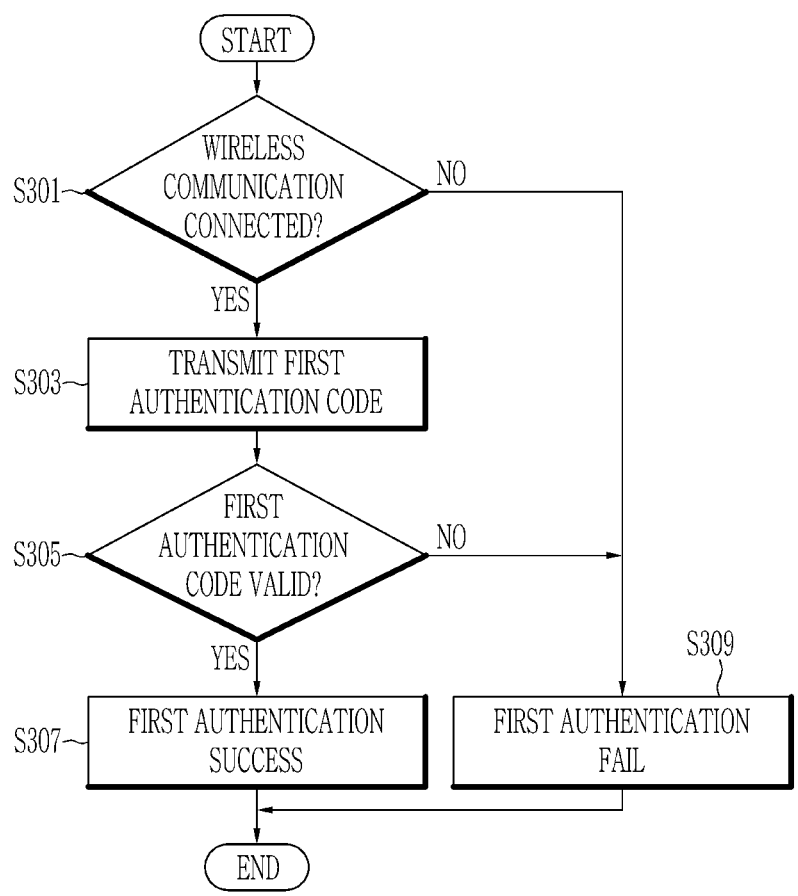
FIG. 6 is a flowchart schematically illustrating a step of first authentication according to an exemplary embodiment of the present invention.

FIG. 6 is a flowchart schematically illustrating a step of first authentication according to an exemplary embodiment of the present invention.

Referring to FIG. 6, a communicating unit 110 of a vehicle connects wireless communication with a user application 12 of a user terminal within a communicating distance of BLE communication through a RF antenna 111 in step S301.

When the wireless communication with communicating unit 110 and the user application is connected, a communication control module 113 transmits first authentication code to the user application in step S303.

The user application 12 determines whether a first authentication key is valid based on the first authentication code in step S305.

The first authentication key and the first authentication code may be generated to have same value. In this regard, in the step S305, the first authentication key may be determined to be valid if the first authentication key and the first authentication code are determined to have same value. For example, the first authentication code and the first authentication key may be defined as MINOR value used in 1st Authentication in BLE communication technology.

Or, the first authentication key and the first authentication code may be generated to have related value. In this regard, in the step S305, the first authentication key may be determined to be valid if the first authentication key and the first authentication code are determined to have related value.

The first authentication is determined to be succeeded when the first authentication key is determined to be valid in step S307. When the first authentication is succeeded, a remote control function for the vehicle is activated in the user application 12, and the user can remotely control the vehicle through the user application 12.

Meanwhile, the first authentication is determined to be failed when the wireless communication with the user application is failed or the first authentication key is determined to be not valid in step S309. When the first authentication is failed, the communicating unit 110 and the user application 12 may retry the first authentication.

Figure 7:
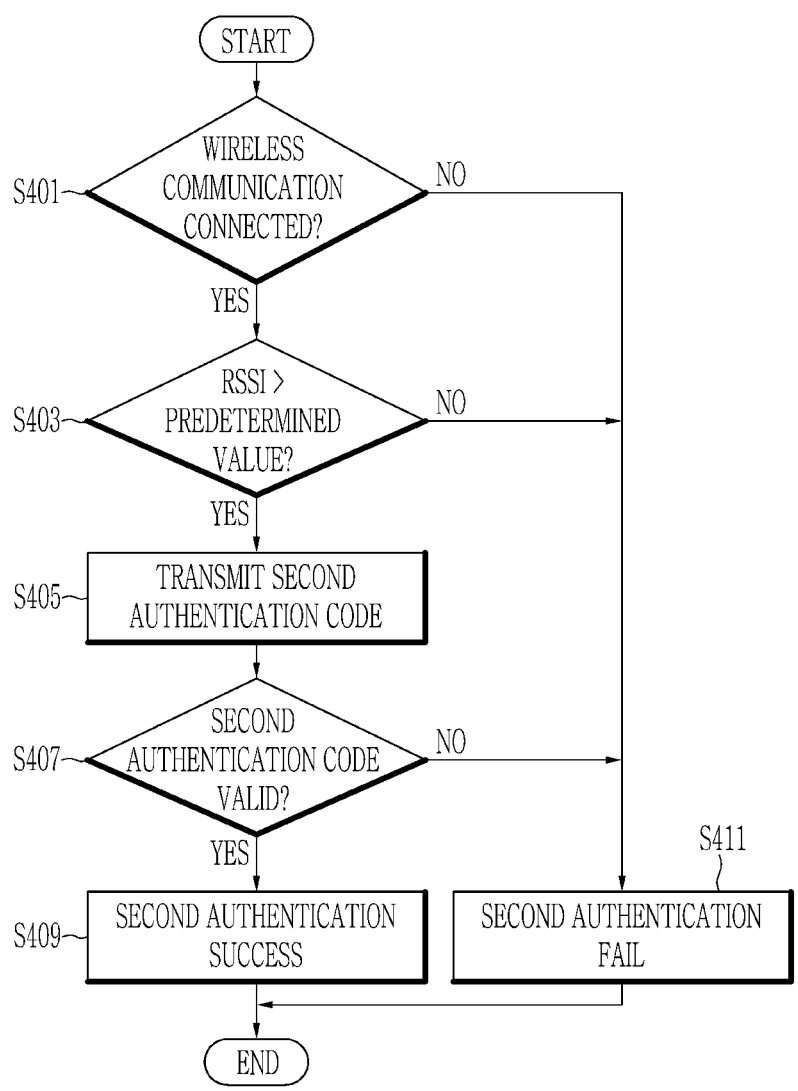
FIG. 7 is a flowchart schematically illustrating a step of second authentication according to an exemplary embodiment of the present invention.

FIG. 7 is a flowchart schematically illustrating a step of second authentication according to an exemplary embodiment of the present invention.

Referring to FIG. 7, when a staring on signal is generated at a start button 140 and input to a controller 150, a communicating unit 110 connects local wireless communication with a user application 12 of a user terminal through a LF antenna at step S401.

A communication control module 113 checks a Received Signal Strength Indication (RSSI) value of the local wireless communication, and determines whether the RSSI value is greater than a first predetermined value in step 403.

When the RSSI value is equal to or greater than a first predetermined value, the communication control module 113 transmits a second authentication code to the user application 12 in step S405.

The first authentication is determined to be succeeded when the first authentication key is determined to be valid in step S307.

The second authentication key and the second authentication code may be generated to have same value. In this regard, in the step S407, the second authentication key may be determined to be valid if the second authentication key and the second authentication code are determined to have same value. For example, the second authentication code and the second authentication key may be defined as a value including MAJOR value and MINOR value used in 1st Authentication in BLE communication technology.

Or, the second authentication key may be generated to have value including both first authentication code the second authentication code. In this regard, in the step S407, the second authentication key may be determined to be valid if the value of the second authentication key is determined to include both the first and second authentication code.

For example, the first authentication code may be defined as MINOR value used in 1st and 2nd Authentication in BLE communication technology, the second authentication code may be defined as MAJOR value used in 2nd Authentication in BLE communication technology, and the second authentication key may be may be defined as a value including both MAJOR value and MINOR value.

Or, the second authentication key and the second authentication code may be generated to have related value. In this regard, in the step S407, the second authentication key may be determined to be valid if the second authentication key and the second authentication code are determined to have related value.

The second authentication is determined to be succeeded when the second authentication key is determined to be valid in step S409. When the second authentication is succeeded, the controller 150 initiates vehicle starting.

Meanwhile, the second authentication is determined to be failed when the wireless communication with the user application is failed, the RSSI value is less than the first predetermined value, or the first authentication key is determined to be not valid in step S411. When the second authentication is failed, the communicating unit 110 and the user application 12 may retry the second authentication.

For cases in which the communicating unit does not include a LF antenna or the local wireless communication is not smooth because of malfunctioning of the LF antenna 112, an exemplary embodiment of the present invention may replace the local wireless communication through LF antenna by wireless communication through RF antenna.

As such, according to an embodiment of the present invention, since the vehicle may be started only when the user terminal exists inside the vehicle, it is possible to prevent the intruder from starting the vehicle and seizing the vehicle even through the door is unlocked outside the vehicle and the intruder arbitrarily opens the door and enters the vehicle.

By limiting the BLE communication range conforming to the second authentication condition for starting the vehicle to the interior of the vehicle, an environment in which the signal may be seized and processed from the outside may not be provided and may be basically blocked, thereby providing a stable smartkey-free vehicle control service. This may provide a stable smartkey-free vehicle control service by blocking a physical hacking access separately from additional and complex security solutions such as logins, user function limitations, encryption logic application, and the like.

Further, it is possible to confirm the position of the user terminal existing outside and inside the vehicle through the RF antenna and the LF antenna that connect the BLE communication with the user terminal and to provide the allowed smart-key free control function according to the confirmed position of the user terminal.

Hereinabove, the exemplary embodiments of the present invention have described, but the present invention is not limited thereto and may be variously modified.

For example, in the exemplary embodiment of the present invention described above, the communicating unit 110 is assumed to be a BLE module, but is not limited and may be implemented through a local communication module.

For example, the communicating unit 110 may also be implemented by at least one of WiFi, wireless LAN, radio frequency (RF), and ZigBee which is capable of performing local communication with the user terminal 10 by the RF and LF antennas which are simultaneously implemented.

Therefore, there is an advantage that a smartkey-free start service may be variously performed according to communication type compatible with the type of user terminal 10.

The above-mentioned exemplary embodiments of the present invention are not embodied only by an apparatus and/or method. Alternatively, the above-mentioned exemplary embodiments may be embodied by a program performing functions, which correspond to the configuration of the exemplary embodiments of the present invention, or a recording medium on which the program is recorded. These embodiments can be easily devised from the description of the above-mentioned exemplary embodiments by those skilled in the art to which the present invention pertains.

While the exemplary embodiments of the present invention have been described in detail, it is to be understood that the invention is not limited to the disclosed embodiments, but on the contrary, is intended to cover various modifications and equivalent arrangements included within the spirit and scope of the appended claims.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for smartkey-free control of a vehicle, the system comprising:
 a head unit having predetermined password and capable of generating a scannable visual code by combining information of the vehicle, wherein the information of the vehicle includes a Vehicle Identification Number (VIN), a first authentication key and a second authentication key;
 a communicating unit configured to connect, though wireless communication, with a user application of a user terminal that is within a predetermined sensing distance, the user application capable of registering the information of the vehicle by scanning the visual code, the communicating unit further configured to perform a first authentication and a second authentication;
 a body control module configured to control the vehicle according to a remote control signal transmitted according to a remote control function of the user application;
 a start button formed inside the vehicle and configured to generate a start on signal by a button input; and
 a controller configured to control a starting of the vehicle such that when the first authentication is successful, the remote control function is activated to perform a door lock/unlock function but no vehicle starting function, wherein the controller is further configured to start the vehicle only in case the second authentication is successful when the start on signal is input.

2. The system of claim 1, wherein the communicating unit is implemented by Bluetooth low energy (BLE).

3. The system of claim 2, wherein the communicating unit comprises:
 an RF antenna configured to radiate an RF signal outside of the vehicle and to perform a remote wireless communication connection with the user terminal; and
 a communication control module storing authentication information of a first authentication code and a second authentication code of the first authentication code, the first and second authentication codes for use in performing the first authentication and the second authentication.

4. The system of claim 3, wherein the communication control module is configured to:
 connect with the user application through wireless communication when the user terminal is detected to be within the predetermined sensing distance, and to transmit the first authentication code to the user application after the user terminal is detected to be within the predetermined sensing distance; and
connect with the user application when a start on signal is input, to check a Received Signal Strength Indication (RSSI) value, and to transmit the second authentication code to the user application when the RSSI value is equal to or greater than a predetermined value.

5. The system of claim 4, wherein the communicating unit further comprises an LF antenna configured to radiate an LF signal inside of the vehicle and to perform a local wireless communication connection with the user application, the communication control module configured to connect with the user application through the LF antenna.

6. The system of claim 1, wherein the controller is configured to transmit a start on signal to any a driving source of an engine, a driving motor, or a fuel cell stack according to the kind of the vehicle.

7. The system of claim 1, wherein the communicating unit is implemented using Wi-Fi, wireless LAN, radio frequency (RF), or ZigBee to perform local communication with the user terminal.

8. A method for smartkey-free control of a vehicle, the method comprising:
performing a first authentication with a user application of a user terminal, the user application having registered information of the vehicle;
receiving a remote control function command from the user application when the first authentication is successful, wherein the remote control function includes a door lock/unlock function but does not include any vehicle starting function;
performing a second authentication with the user application when the start on signal is input; and
initiating the starting of the vehicle when the second authentication is successful.

9. The method of claim 8, wherein registered information of the vehicle includes a Vehicle Identification Number (VIN), a first authentication key, and a second authentication key.

10. The method of claim 9, wherein performing the first authentication comprises:
connecting, by a communicating unit of the vehicle, with the user application of the user terminal when the user terminal is within a predetermined sensing distance; and
transmitting, by the communicating unit, a first authentication code to the user application so that the user application can determine whether the first authentication key is valid based on the first authentication code; and
wherein performing the second authentication comprises:
connecting, by the communicating unit, with the user application;
determining, by the communicating unit, whether a Received Signal Strength Indication (RSSI) value is equal to or greater than a predetermined value; and
transmitting, by the communicating unit, a second authentication code to the user application, wherein the user application can determine whether the second authentication key is based valid based on the first authentication key and the second authentication key.

11. The method of claim 10, wherein performing the first authentication further comprises:
determining, by the communicating unit, that the first authentication has failed when a wireless communication with the user application is failed or the first authentication key is not valid; and
retrying the first authentication when the first authentication is failed; and
wherein performing the second authentication comprises:
determining, by the communicating unit, that the second authentication has failed when the RSSI value is less than the predetermined value or the second authentication key is not valid; and
retrying the second authentication when the second authentication is failed.

12. The method of claim 10, wherein, in the performing the first authentication, the communicating unit connects with the user terminal through an RF antenna of the communicating unit; and
wherein, in the performing the second authentication, the communicating unit connects with the user application through an LF antenna or the RF antenna of the communicating unit.

13. The method of claim 12, wherein
the predetermined value is a first value when the communicating unit is connected with the user application through the LF antenna; and
the predetermined value is a second value when the communicating unit connected with the user application through the RF antenna.

14. A method for smartkey-free control of a vehicle, method comprising:
operating a user application installed in a user terminal;
registering information of the vehicle in the user application;
performing, by the user application, a first authentication with a communicating unit of the vehicle;
activating a remote control function in the user application when the first authentication is successful, wherein the remote control function includes a door lock/unlock function but does not include any vehicle starting function;
performing, by the user application, a second authentication with the communicating unit when the start on signal is input; and
initiating the starting of the vehicle when the second authentication is successful.

15. The method of claim 14, wherein registering the information of the vehicle in the user application comprises:
inputting, by a user, a predetermined password;
scanning, by the user application, a visual code generated by a head unit of the vehicle, the visual code generated by combining the information of the vehicle;
interpreting the scanned visual code and loading the information of the vehicle; and
storing, by the user application, the information of the vehicle, wherein the information of the vehicle includes a Vehicle Identification Number (VIN), a first authentication key, and a second authentication key.

16. The method of claim 15, wherein storing the information of the vehicle comprises:
deleting previously registered vehicle information and storing the information of the vehicle when the loaded vehicle information overlaps with the previously registered vehicle information; and
storing the information of the vehicle when the loaded vehicle information does not overlap with the previously registered vehicle information.

17. The method of claim 15, wherein performing the first authentication comprises:

connecting the user application with a communicating unit of the vehicle when the user terminal is within a predetermined sensing distance;

receiving a first authentication code transmitted by the communicating unit at the user application; and determining, by the user application, whether the first authentication key is valid based on the first authentication code; and wherein the performing the second authentication comprises:

connecting the user application with the communicating unit;

receiving a second authentication code transmitted by the communicating unit at the user application; and determining, by the user application, whether the second authentication key is based valid based on the first and second authentication key.

18. The method of claim 14, wherein operating the user application further comprises determining, by a user of the user application, whether to register the information of the vehicle in the user application, wherein the first authentication can be performed without registering the information of the vehicle in the user application.

19. The method of claim 14, wherein, in the performing the first authentication, the user terminal connects with the communicating unit through an RF antenna; and wherein, in the performing the second authentication, the user terminal connects with the communicating unit through an LF antenna.

* * * * *